Jan. 12, 1965   YVES-JEAN F. BRETTE   3,165,592
METHOD OF AND MEANS FOR NEUTRALIZING INDUCTIVE
DISTURBANCES IN MAGNETIC REPRODUCERS
Filed April 18, 1960   2 Sheets-Sheet 1

Jan. 12, 1965  YVES-JEAN F. BRETTE  3,165,592
METHOD OF AND MEANS FOR NEUTRALIZING INDUCTIVE
DISTURBANCES IN MAGNETIC REPRODUCERS
Filed April 18, 1960  2 Sheets-Sheet 2

United States Patent Office 3,165,592
Patented Jan. 12, 1965

3,165,592
METHOD OF AND MEANS FOR NEUTRALIZING INDUCTIVE DISTURBANCES IN MAGNETIC REPRODUCERS
Yves-Jean François Brette, Sevres, France, assignor to Compagnie des Machines Bull (Societe Anonyme), Paris, France
Filed Apr. 18, 1960, Ser. No. 22,767
Claims priority, application France, Apr. 23, 1959, 792,929, Patent 1,222,229
1 Claim. (Cl. 179—100.2)

In order to avoid induction of parasitic signals in the windings of an elecetromagnetic transducer element used for reading magnetic recordings, use is made of screens of appropriate material which are disposed around the said element in such manner as to protect it from the action of the undesirable magnetic fields. This method is relatively costly and has disadvantages, while in addition its application is difficult in some cases.

When a reading transducer is coupled to a writing transducer along a common recording track in order to constitute what will hereinafter be called a double magnetic head, the thickness of the screens which it is possible to dispose between the two transducers in order to avoid cross-talk between these elements is smaller in proportion as the distance between the reading air gap and the writing air gap is reduced. The effectiveness of these screens is accordingly reduced and, when it is desired to reduce this distance below a certain value, the writing signals applied to the windings of the writing transducer unavoidably set up in the windings of the associated reading transducer interference signals of appreciable amplitude, so that the resultant signals obtained at the terminals of the windings of the reading transducer during the application of the writing signals are substantially unusable.

In order to obviate this disadvantage, it has been proposed to connect in series with the windings of the reading transducer a balancing winding wound on the magnetic circuit of the writing transducer. There are thus set up in opposition to the electromotive forces induced by the writing signals in the windings of the reading transducer the electromotive forces induced by these same signals in the balancing winding.

However, an exact compensation of the electromotive interference forces is not obtained by this method, because in practice these forces are slightly out of phase and deformed in relation to the electromotive forces induced in the balancing winding.

It is therefore desirable to set up in opposition to the electromotive interference forces electromotive balancing forces having the same phase difference and the same deformation. In accordance with one embodiment of the invention, this is done by using a reading head comprising a magnetic core with two parallel branches and two reading windings, each reading winding being wound on a different branch of said core, and by cutting off from the electromotive interference forces induced by the writing signals in one of said reading windings the electromotive interference forces induced by these same writing signals in the other reading winding, one of said reading windings being wound on a branch of said core in which the ratio of the parasitic magnetic flux to the useful magnetic reading flux is higher than, and of opposite sign to, that existing in the branch of said core which carries the other reading winding.

This embodiment of the invention is more advantageous in proportion as the aforesaid ratios are different, that is to say, as the circuits of the stray fluxes passing through each reading winding respectively have different reluctances, provided that every precaution is taken to avoid the introduction of different phase shifts into the electromotive forces induced by the said stray fluxes.

The various objects, advantages and features of the invention will become apparent from the following description and from the accompanying diagrammatic drawings, in which:

FIGURE 1 illustrates diagrammatically a double magnetic head comprising a writing transducer element 11, also called writing or recording head, and a reading transducer element 21 also called reading head.

Figure 1:
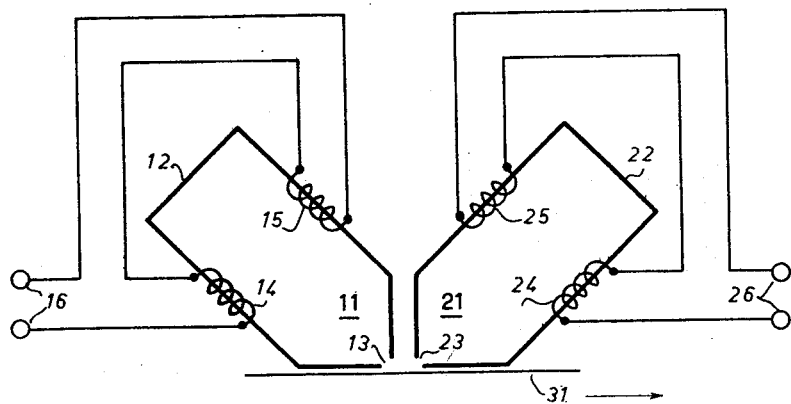
FIGURE 1 shows a double magnetic head to which the invention is applied with advantage.

The recording head 11 comprises a magnetic core 12 with one non-magnetic gap therein, called writing air gap 13, and two windings 14 and 15 connected in series and wound in flux-adding relationship on the core 12. Likewise, the reading head 21 comprises a magnetic core 22 having two parallel branches forming a magnetic path which is closed except for one non-magnetic gap therein, called reading air gap 23. A first reading winding 25 is wound on one branch of the core 22 and a second reading winding 24 is wound on the other branch of this core. The windings 24 and 25 are connected in series, and coupled in flux-adding relationship on the core 22.

The electric signals representing the information which is to be written by the transducer 11 on the magnetic recording medium 31 during the movement of the latter in the direction of the arrow are applied to the terminals 16. The electric signals representing the information read by the transducer 21 on the magnetic recording medium 31 appear at the terminals 26.

If the windings 24 and 25 have the same number of turns, the magnetomotive forces applied to the reading air gap 23 generate identical electromotive forces E at the terminals of each of these windings. Since these windings are wound in flux-adding relationship on the core 22, these electromotive forces E add one to another. However, the electromotive interference forces $e_1$ and $e_2$ induced in the windings 24 and 25 respectively by the stray fluxes generated by the writing transducer 11 when the signals are applied to the terminals 16 have not the same value, are of opposite directions, and the ratio of these electromotive interference forces is constant. We therefore have:

$$\frac{e_2}{e_1} = k \neq 1 \qquad (1)$$

with, generally: $k > 1$.

In a first embodiment of the invention, for cancelling out the effects of these stray fluxes at the terminals 26, there is cut off from the signal set up at the terminals of the winding 24 the fraction $1/k$ of the signal picked up at the terminals of the winding 25.

Figure 2:
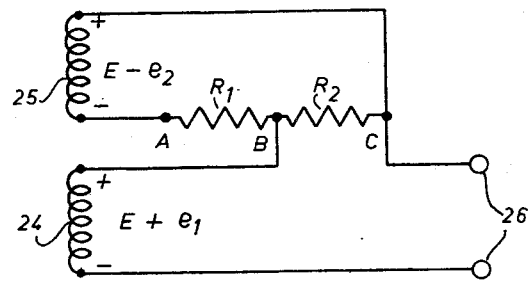
FIGURES 2, 3 and 4 show the electric circuit of the reading element according to a first, a second and a third embodiment of the invention respectively.

FIGURE 2 illustrates a circuit by means of which the electromotive interference forces can be cancelled out at the terminals 26. This circuit comprises the windings 24 and 25 of the reading element, the output terminals 26 and resistances denoted by their values $R_1$ and $R_2$, such that $$\frac{R_2}{R_1+R_2} = \frac{e_1}{e_2} = \frac{1}{k}$$

If the resistance of the windings and the currents normally supplied thereby when a load circuit is connected to the terminals 26 is disregarded, it will be seen that the potential difference between B and C has the value $$(E-e_2)\frac{R_2}{R_1+R_2}=\frac{E-e_2}{k}$$

If the windings are connected in the appropriate direction, the voltage U set up between the terminals 26 will have the value $$E+e_1-\frac{E-e_2}{k}$$

that is to say:

$$E\frac{k+1}{k}$$

since $$\frac{e_2}{e_1}=k$$

In this ideal theoretical case, the electromotive interference forces $e_1$ and $e_2$ therefore would not appear therein and the useful signal obtained at the terminals 26 would be lower and closer to E in proportion as the relation $$k=\frac{e_2}{e_1}$$

is larger.

Figure 3:
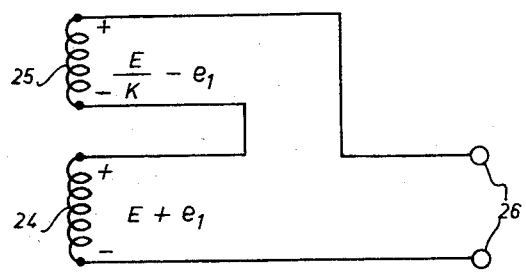

FIGURE 3 represents another circuit arrangement by means of which the component due to the electromotive interference force generated in the winding 24 can be cancelled out in the signal set up at the output terminals 26. For this purpose, the winding 24 is formed of a number of turns $N_1$ and the winding 25 of a number of turns $N_2$, the numbers $N_1$ and $N_2$ being such that:

$$\frac{N_1}{N_2}=\frac{v_2}{v_1}=k \quad (2)$$

$v_1$ and $v_2$ being the values of the electromotive interference forces in a turn of the winding 24 and in a turn of the winding 25 respectively. The electromotive interference forces $e_1$ and $e_2$ set up at the terminals of the windings 24 and 25 then have the values $N_1v_1$ and $N_2v_2$ respectively and are of opposite direction in the reading circuit. They are equal owing to the preceding relation (2).

The connection in series, in the appropriate direction of the windings 24 and 25 therefore also makes it possible to obtain at the terminals 26 a voltage $$U=E\frac{k+1}{k}$$

which is free from any components generated by the stray fluxes of the writing element.

Figure 4:
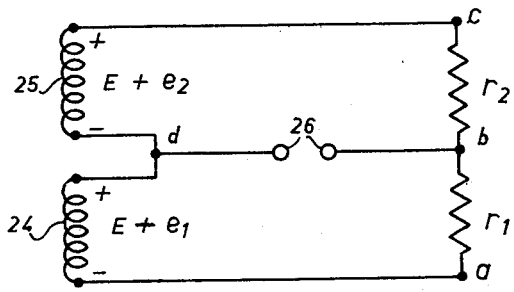

FIGURE 4 shows how the windings 24 and 25 of the reading element can be connected in parallel to the output terminals 26 in order to supply a signal free from cross-talk. Each of these windings is then connected in series with a resistance of appropriate value, namely $r_1$ and $r_2$ respectively.

In order that it may be possible to apply the method according to the invention in the manner hereinbefore described, it is necessary for the ratio $$\frac{e_2}{e_1}=k$$

to be different from 1, and it has been seen that the useful signal resulting from the operation is then lower and closer to E in proportion as the said ratio $k$ is larger. Any measure tending to increase the stray flux of the writing element through one of the windings of the reading element, or to reduce that passing through the other winding, will therefore be favourable to this form of application of the method, provided that no phase difference is introduced between these fluxes.

Figure 5:
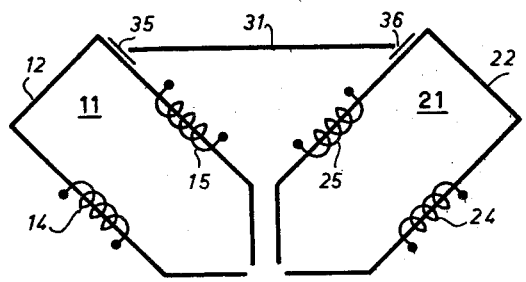
FIGURES 5 and 6 show other applications of the method of the invention.

FIGURE 5 shows by way of example a magnetic shunt 31 disposed between the transducer elements 11 and 21 and intended to increase the stray flux through the winding 25. Elements 35 and 36 of an appropriate substance may be provided between the ends of the said magnetic circuit element 31 and the magnetic circuits 12 and 22 respectively, so as to adjust the magnitude and the phase difference of the stray flux derived from this magnetic circuit element.

In accordance with another embodiment of the invention, it is proposed to generate magnetic balancing fluxes in such manner as to cancel out the effects of the stray fluxes of the writing element in the reading winding or windings.

If the reading element comprises only one winding, it will be arranged that the resultant of these stray and balancing fluxes is zero through the said element. If the reading element comprises a number of windings, the resultants of the said fluxes through these windings need not be zero. It is sufficient for the electromotive forces induced by these resultant fluxes not to be set up at the output terminals of the electric circuit of the reading element.

It will be obvious, that in order to achieve this result, the principles hereinbefore set out in regard to the balancing of the windings of the reading element may then be utilised in combination with those now indicated regarding the production of the magnetic balancing flux.

In the double magnetic head illustrated in FIGURE 1, the winding 15 may be used to generate a magnetic stray flux cancelling out the effects produced in the reading windings by the stray flux generated by the winding 14. The winding 15 will for this purpose consist of a predetermined number of turns and will be approximately connected to the winding 14.

Balancing magnetic fluxes may also be generated by independent electromagnetic elements disposed and fed in an appropriate manner. This means will be utilised when it is not possible to dispose a balancing winding on the magnetic circuit of the writing element, for example when it is desired to suppress cross-talk between existing transducer element.

Figure 6:
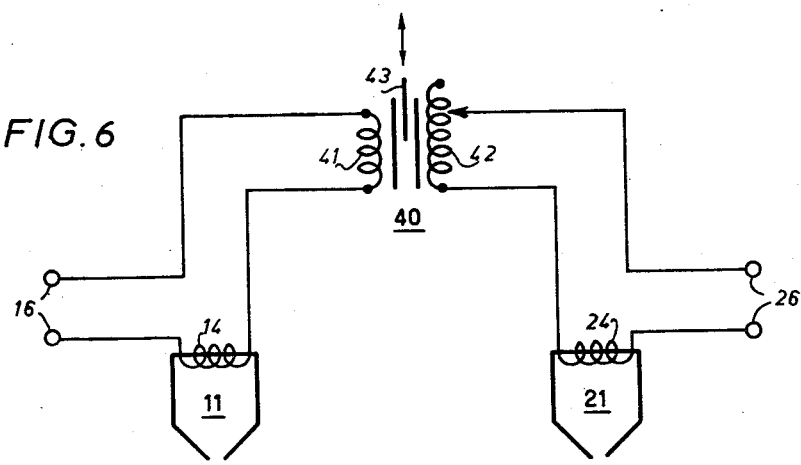

As is illustrated in FIGURE 6, the signals applied to the transducer 11 and resulting in the interference signals in the electric circuit of the transducer 21 may also be applied to the primary winding 41 of the transformer 40 so as to obtain across the output terminals of the secondary winding 42 signals which can be set up in opposition to the interference signals. These signals will be made identical with the interference signals and brought into phase therewith by adjusting the characteristics of the transformer, for example by introducing a screen 43 of conductive material into the circuit of the flux common to the two windings, in order to modify the coupling thereof by eddy current.

The invention is especially applicable to a double magnetic head intended for the simultaneous writing and reading of pulses on a common track of a magnetic tape, wherein the distance between the writing air gap and the reading air gap is smaller than 4 millimetres.

I claim:

In a double magnetic head unit comprising a recording magnetic head and a reading magnetic head, said recording magnetic head comprising a magnetic core having a first non-magnetic gap, and at least one recording winding wound on said core of recording head, said magnetic reading head comprising a magnetic core forming two parallel branches with a second non-magnetic gap located in the neighbourhood of said first non-magnetic gap, a first reading winding which is wound on the branch of said reading head core and located in the nearest proximity of said recording head, a second reading winding wound on the other branch of said core, said reading windings being serially connected in an electric reading circuit and being wound in flux-adding relationship on said core of the reading head, said reading windings being submitted to magnetic stray fluxes of different values generated by said recording head when recording signals are applied to said recording winding, the electromotive interference forces induced by said stray fluxes in each of said reading windings being of opposite directions in said electric reading circuit, and the turn ratio of said second reading winding with respect to said first reading winding being equal to the ratio of the electromotive interference force induced in one turn of said first reading winding to the electromotive interference force induced in one turn of said second reading winding.

References Cited by the Examiner

UNITED STATES PATENTS

| | | | |
|---|---|---|---|
| 2,351,008 | 6/44 | Camras | 179—100.2 |
| 2,658,114 | 11/53 | Buhrendorf | 179—100.2 |
| 2,806,092 | 9/57 | Livadary | 179—100.2 |
| 2,926,220 | 2/60 | Camras | 179—100.2 |
| 2,969,529 | 1/61 | Gilson | 179—100.2 |

FOREIGN PATENTS

| | | |
|---|---|---|
| 1,034,381 | 7/58 | Germany. |
| 642,136 | 8/50 | Great Britain. |
| 802,210 | 10/58 | Great Britain. |
| 803,624 | 10/58 | Great Britain. |
| 804,735 | 11/58 | Great Britain. |

IRVING L. SRAGOW, *Primary Examiner.*

BERNARD KONICK, NEWTON N. LOVEVELL,
*Examiners.*